INVENTOR
HARRY Y. CARSON

Patented Feb. 3, 1942

2,271,936

UNITED STATES PATENT OFFICE 2,271,936

PIPE JOINT

Harry Y. Carson, Tarrant, Ala.

Application December 9, 1940, Serial No. 369,152

5 Claims. (Cl. 285—163)

This invention relates to a bell and spigot type pipe joint, and more particularly to such a joint for cast iron pipe, and has for one of its objects the provision of a simple economical joint which may be readily assembled without the necessity of special tools, and which, when assembled, shall be effective to resist separation due to internal pressure.

A further object of my invention is to provide a joint of the character described including a divided rubber gasket, a part of which may be installed and cemented in place at the factory before the pipe are shipped, and the remainder installed and cemented in place in the field, the cooperating parts of the gasket having interlocking members to resist separation.

As is well known in the art to which my invention relates, cast iron pipe is rarely true to intended size, combined variations in size amounting to as much as one-eighth inch in six inch pipe and more in larger size pipe. Also the castings are rough and often out of round. Any joint packing, if it is to be leak proof, must accordingly accommodate itself to the unevenness of the castings and variations in size. Factory assembled joints have heretofore been proposed, but they depended for their success upon uniformity of size and round, and evenness of surface to be packed. It is accordingly a principal object of my invention to provide a pipe joint which may be partially assembled in the factory, and the final assembly readily completed in the field, which shall accommodate itself to the ordinary defects of manufacture, and which shall be a highly effective packing, simple of construction, and economical of manufacture.

Briefly, my invention comprises a bell and spigot type pipe joint in which there is provided a relatively deep annular groove in the bell end of the pipe, in which groove there is mounted at the factory and cemented in place a rubber ring having an inwardly inclined serrated face, and a cooperating ring having a complemental face is mounted and cemented in place on the spigot end of the pipe joint in the field, the cooperating ring being provided with serrations which interlock with those of the first mentioned ring, and in which the cement acts as an additional sealing member, besides holding the parts together.

A pipe joint embodying features of my invention is illustrated in the accompanying drawing forming a part of this application, in which Fig. 1 is a sectional view showing a pipe joint disassembled;

Figure 1:
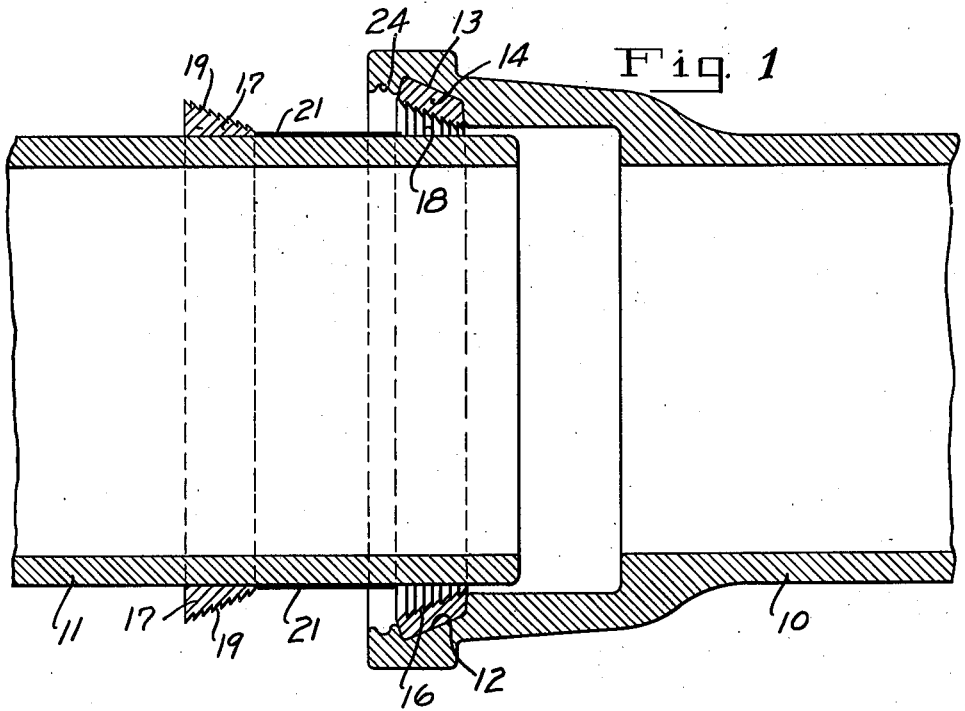

Referring to the drawing, I show a pipe joint embodying a bell section 10 and a spigot section 11 fitting into the bell. The bell section 10 is provided with an inner annular groove 12 which may have an outwardly flared bottom 13. Fitting into the groove 12 is the outer section 14 of a divided rubber gasket which, in accordance with my invention, is preferably mounted in the groove and cemented in place at the factory. The gasket portion 14 is provided with serrations, one side 16 of each being inclined to the long axis of the pipe joint to permit the ready insertion of an inner gasket portion 17 in the vertical surface 18, and the better to hold the gasket portions interlocked when assembled. The inner serrated surface of the gasket portion 14, as will be seen in the drawing, is outwardly flaring, which aids in the insertion of the inner gasket portion 17.

Figure 3:
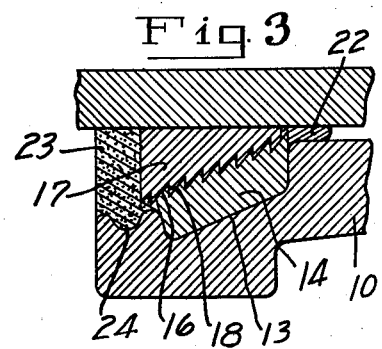
Fig. 3 is a fragmental sectional view drawn to a larger scale, the serrations being exaggerated somewhat in size the better to illustrate the interlocking of the serrations of the gasket portions.

The inner gasket portion 17 is provided with an outer serrated surface 19 complemental to the inner surface of the outer section 14, the serrations of the surface 19 being adapted, when the inner portion 17 is driven into engagement with the inner portion 14, to interlock, as shown in Fig. 3, to resist separation. The inner gasket section 17 is designed to fit snugly about the spigot section 11 of the joint, and should be of such diameter as to necessitate stretching to mount it on the spigot section. The inner surface of the inner section 17 is relatively wide, as may be seen in Fig. 1, to provide ample packing engagement with the spigot.

In assembling the joint, the outer section 14, as already stated, is cemented in place at the factory. When the joint is to be installed, the inner section 17 is mounted on the spigot, as shown in Fig. 1, and a relatively heavy coating of cement 21 is spread on the spigot and on the serrated surface 19 of the inner section 17. There are a number of rubber cements on the market, suitable for this purpose which are well known in the art and need no detailed description. Such cement acts to bind effectively the rubber to the iron pipe when allowed to set, and also binds together effectively the two sections of the gasket. Such cements also act as a lubricant before setting and thus permit the inner gasket section to be easily moved along the spigot section of the pipe. In putting the cement on the spigot section of the pipe joint and on the inner section of the gasket, I preferably provide an excess so that when the sections are fully assembled, as shown in Figs. 2 and 3, there is squeezed out a protecting ring 22 of cement, which hardens and acts as an additional seal for the joint inwardly of the gasket.

Figure 2:
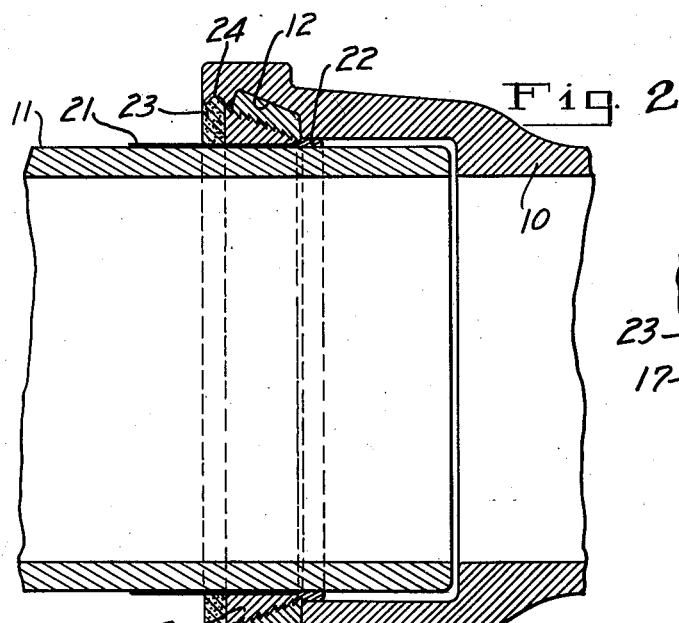
Fig. 2 is a sectional view showing the joint assembled.

When the spigot section 11 is fully inserted into the bell 10, as shown in Fig. 2, the inner section 17 is preferably driven into place, as with a wide nose calking tool. This effects an interlocking of the serrations, as shown in Fig. 3, and causes the resilient rubber gasket to accommodate itself to the unevenness and inequalities of the pipe surface, firmly squeezes the gasket surfaces together to insure complete engagement, and squeezes out the protective ring of cement 22 ahead of the gasket sections. After assembling, the outer surface of the assembled gasket sections may be protected by a ring 23 of any suitable sealing means, such as Portland cement, calking cement, lead, or other suitable sealing means, there being provided a groove 24 near the outer end of the bell to hold the assembled sealing means in place.

In describing the gasket sections 14 and 17 as being made of rubber, it will be understood that I contemplate not only natural rubber, but substances ordinarily referred to as synthetic rubber and having properties similar to natural rubber.

From the foregoing it will be apparent that I have devised an improved packing joint which is simple and economical of design, readily assembled, and effective for the purposes described.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are imposed by the prior art or as are specifically set forth in the appended claims.

What I claim is:

1. In a packing joint for bell and spigot pipe, a bell having an inner annular groove, a rubber gasket cemented in place in the groove and having a serrated outwardly flaring inner surface, a spigot cooperating with the bell, a cooperating rubber gasket on the spigot having an outer serrated surface complemental to that of the bell gasket and adapted to be driven into engagement with the bell gasket to effect interlocking of the serrations, and cement binding the two gaskets together and to the spigot end of the pipe.

2. In a packing joint for bell and spigot pipe, a bell having an inner annular groove, a rubber gasket cemented in place in the groove and having a serrated outwardly flaring inner surface, a spigot cooperating with the bell, a cooperating rubber gasket on the spigot having an outer serrated surface complemental to that of the bell gasket and adapted to be driven into engagement with the bell gasket to effect interlocking of the serrations, and cement forming an inner seal for the joint and binding the two gaskets together and to the spigot end of the pipe.

3. In a packing joint for bell and spigot type cast iron pipe, a bell section having an annular groove therein, a spigot section fitting in the bell, a rubber gasket divided to provide inner and outer portions fitting in the groove and surrounding the spigot, the line of division of said gasket being outwardly flaring with respect to the bell, cooperating interlocking serrations between the inner and outer portions, and cement binding the gasket portions together and to the pipe sections.

4. In a packing joint for bell and spigot type cast iron pipe, a bell section having an annular groove therein, a spigot section fitting in the bell, a rubber gasket divided to provide inner and outer portions fitting in the groove and surrounding the spigot, the line of division of said gasket being outwardly flaring with respect to the bell, cooperating interlocking serrations between the inner and outer portions, cement binding the gasket portions together and to the pipe sections, and a ring of rubber cement forming a seal around the inner edge of the gasket.

5. In a packing joint for bell and spigot type cast iron pipe, a bell section having an annular groove therein, a spigot section fitting in the bell, a rubber gasket divided to provide inner and outer portions fitting in the groove and surrounding the spigot, the line of division of said gasket portions being outwardly flaring with respect to the bell, cooperating interlocking serrations between the inner and outer portions, said serrations having sides inclined to the long axis of the pipe joint to permit the inner portion to be driven into interlocking engagement with the outer and vertical sides to resist separation when interlocked, cement binding the gasket portions together and to the pipe sections, and a ring of cement forming a seal around the inner edge of the gasket.

HARRY Y. CARSON.